United States Patent [19]

Glenn

[11] Patent Number: 4,888,937
[45] Date of Patent: Dec. 26, 1989

[54] APPARATUS FOR BAGGING HAY BALES

[76] Inventor: Willis H. Glenn, Olin, Iowa 52320

[21] Appl. No.: 572,538

[22] Filed: Jan. 20, 1984

[51] Int. Cl.⁴ .......................... B65B 9/10; B65B 43/42
[52] U.S. Cl. ........................................ 53/567; 53/576;
53/459
[58] Field of Search ................. 53/567, 576, 513, 255,
53/459, 260, 469, 258, 570, 575; 141/10, 114,
313, 390; 414/24.3, 111, 607, 608, 724; 198/861;
56/341, 343 X

[56] References Cited
U.S. PATENT DOCUMENTS

| RE. 9,956 | 12/1881 | Dederick | 53/258 |
|---|---|---|---|
| 3,380,220 | 4/1968 | Jennings et al. | 53/24 |
| 3,389,533 | 6/1968 | Tipper et al. | 53/134 |
| 3,650,298 | 3/1972 | Delmar | 138/103 |
| 3,662,514 | 5/1972 | Goss | 53/37 |
| 3,934,726 | 1/1976 | Martin | 414/24.5 |
| 3,983,914 | 10/1976 | Benson | 141/390 |
| 4,044,525 | 8/1977 | Forsgren | 53/567 |
| 4,120,405 | 10/1978 | Jones et al. | 414/24.5 |
| 4,300,327 | 11/1981 | Bridger | 53/255 |
| 4,337,805 | 7/1982 | Johnson et al. | 141/114 |

FOREIGN PATENT DOCUMENTS 2151116 8/1978 Fed. Rep. of Germany ...... 141/114

OTHER PUBLICATIONS

Stephen Howe, "Danes Inject New Life into Straw", *Power Farming*, Jun. 1983, pp. 56–57.
Bill Eftink and Bill Miller, "New Equipment Makes Baling Silage More Practical", *Successful Farming*, Planting Issue, Mar. 1984, pp. B2 and B3.
Advertising Literature by Silopress, Inc. U.S.A., Sioux City, Ia., "Your Future in Sealed Storage ... Today". 6 pp.
Advertising Literature by Munsell Enterprises, Fowlerville, Mich., "Porta-Packer, The Forage Bagger You Can Afford", 2 pages.
Advertising Newsletter by AG-Bag Corporation, Astoria, Ore., Vol. 12, "The AG-Bag Messenger", 1984, 8 pages.

*Primary Examiner*—Robert L. Spruill
*Assistant Examiner*—Beth Bianca
*Attorney, Agent, or Firm*—Neuman, Williams, Anderson & Olson

[57] ABSTRACT

A method and apparatus for facilitating the bagging of large round hay bales. The apparatus has a supporting frame that supports a large ring on which a large flexible radially accordian-folded plastic tube is mounted. By positioning a bale inside of the ring and then moving the apparatus, the bale is covered by the plastic tube. The process is repeated until the tube is filled with bales.

12 Claims, 1 Drawing Sheet

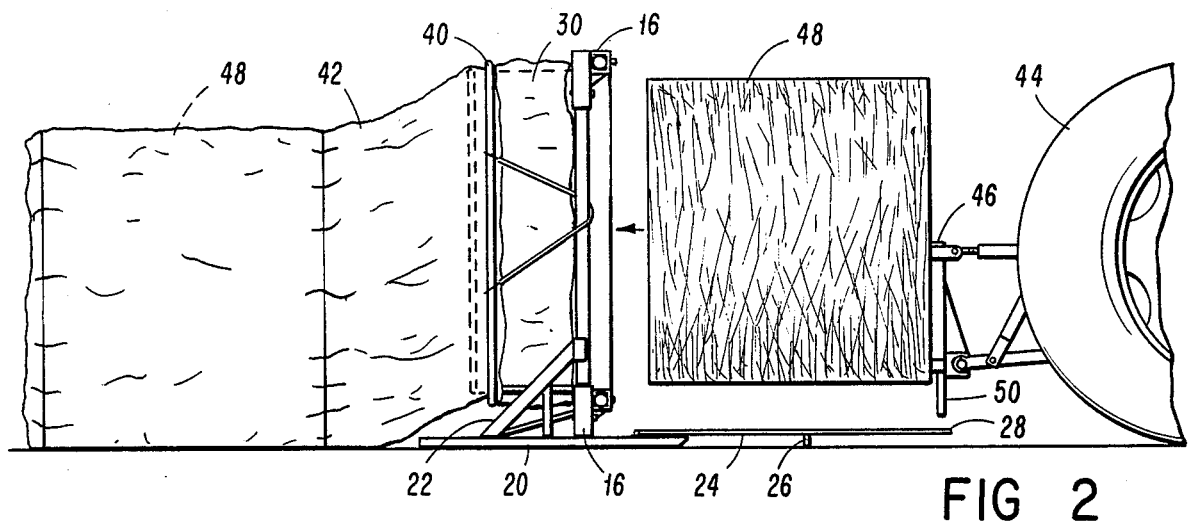
FIG 2
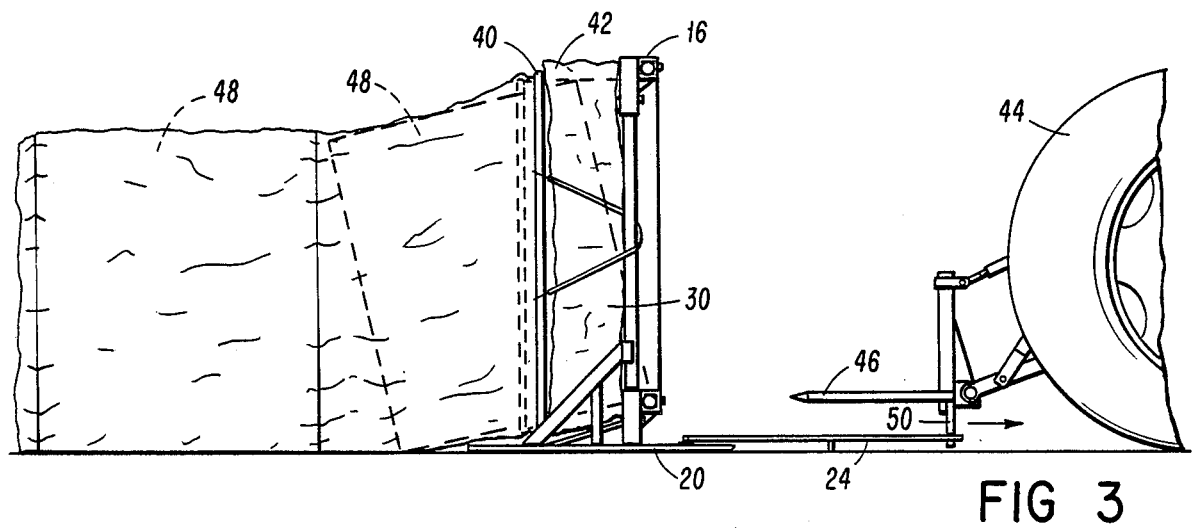
FIG 3
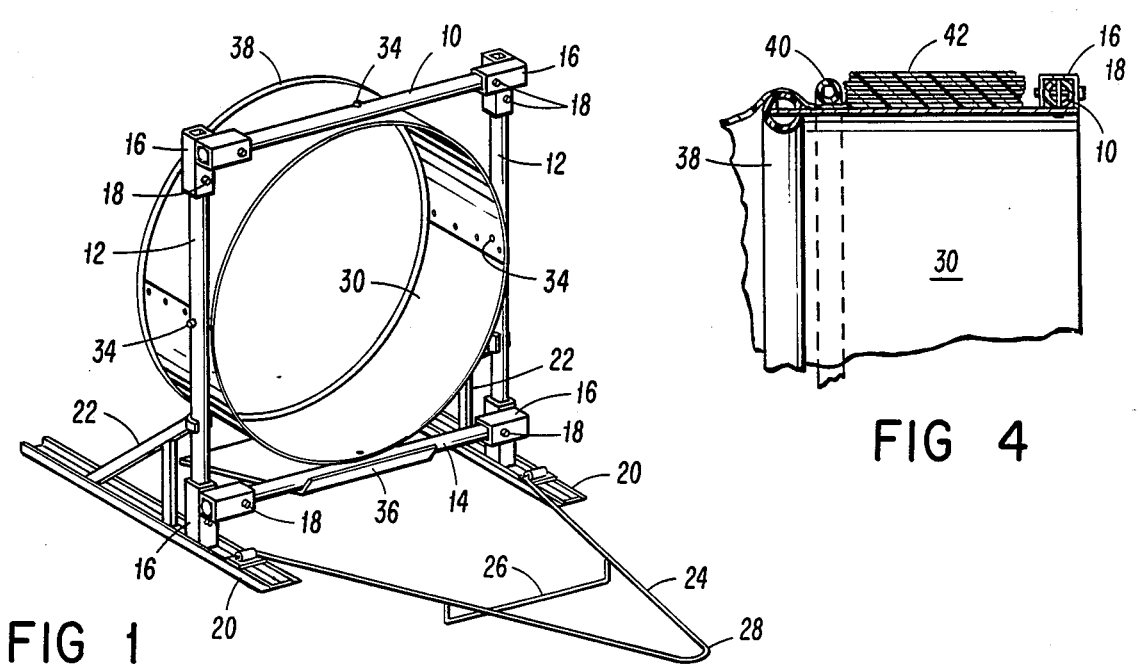
FIG 1
FIG 4

APPARATUS FOR BAGGING HAY BALES

BACKGROUND OF THE INVENTION

In recent years, there has been developed improved equipment for baling hay into large round bales. This equipment presently commercially available will produce bales of different sizes up to six and one half (6 ½) feet in diameter. These large bales are sufficiently heavy that they cannot be manually moved. Frequently, the bales are therefore left standing in the field and then covered with a moisture impervious covering such as plastic sheet material. This will then protect the hay bales from the weather until they are ready for use, and of course this eliminates the necessity of moving the bales into a barn or other covered facility. In order to completely protect the bales standing in the field, there are available large bags of plastic material into which the bales can be placed and thus completely shielded from the moisture produced by rain and snow. However, because of the size of the bales, they cannot easily be placed inside of the bags. Presently, the bales must be bagged manually which requires at least two persons. There is therefore a need for an apparatus that will assist the farmer in bagging these large bales. Such an apparatus should be simple and one that can be used by each and every farmer with a minimum of effort and at a minimum cost.

SUMMARY OF THE INVENTION

The invention consists of an apparatus that has no moving parts but will enable one person to quickly and easily bag the large round bales. The apparatus consists of a large ring mounted on a supporting frame which has skids. A large plastic tube is folded or gathered accordion style, and the tube is slipped over the large ring and held in place by an elastic or other suitable band. The free end of the plastic tube is manually pulled rearwardly from the ring and tied together in order to provide a closed end. A tractor with a bale carrier, such as a spike, is used to pick up a bale and position it through the large ring into the closed end of the tube where it is set down. The apparatus has a tongue extending from the front lower edge of the ring, and this tongue is then engaged to pull the apparatus forwardly away from the bale thus leaving the bale in the plastic tube. As the apparatus is pulled forwardly, the next section of the tube unfolds from the ring, ready to receive the next bale. The process is then repeated.

BRIEF DESCRIPTION OF THE DRAWINGS

FIG. 1 is a perspective view of an apparatus constructed according to the principles of the invention;

FIG. 2 is a side elevational view of the apparatus showing the plastic tube in place and illustrating a bale being lifted for positioning inside of the apparatus;

FIG. 3 is a side elevational view similar to FIG. 2 and showing the bale having been placed inside of the tube and the apparatus being pulled by the tractor away from the bale; and FIG. 4 is a view, partly in section, of a portion of the upper portion of the apparatus and showing a radially accordian folded tube in position around the ring.

DESCRIPTION OF THE PREFERRED EMBODIMENT OF THE INVENTION

Referring first to FIG. 1 of the drawings, the device consists of a rectangular frame that has an upper horizontal member 10 joined at its ends to two spaced apart vertical frame members 12. The upright frame members 12 are in turn joined at their lower ends to a lower frame member 14. The frame members 10, 12 and 14 may be joined together in any suitable manner such as that shown in FIG. 1 in which hollow rectangular tubes are welded together at right angles to form corner members 16 into which the frame members 10, 12 and 14 can be inserted. The frame members 10, 12 and 14 are then held in place by the use of suitable fasteners 18 which can be bolts and nuts passed through openings drilled in the ends of the frame members 10, 12 and 14 and holes drilled into the corner members 16. This construction permits the apparatus to be quickly and easily disassembled for shipping and reassembled for use. Affixed to the bottom of the lower corner members 16 are a pair of parallel skids 20 that form the supporting base for the apparatus. To make the apparatus rigid, the skids are preferably provided with braces 22 which are welded or otherwise permanently affixed to the skids 20. Also, the lower corner members 16 are preferably also welded or affixed to skids 20, but braces 22 are detachable from the upright frame members 12. Thus, when the apparatus is disassembled, a skid 20 with braces 22 and a corner member 16 affixed to it forms a unitary component.

As best seen in FIG. 1, a hitch means or tongue 24 consists of a rod shaped into a triangle or "V" with the free ends of two legs of the triangle or "V" being pivotally secured to the forward end of the skids 20. Tongue 24 also has a depending skid 26 that maintains the forward end 28 off the ground for a purpose that will be evident from the description of the use of the apparatus.

Detachably secured to the frame members 10, 12 and 14 is a large annular member or ring 30. Ring 30 is preferably formed from heavy metal or plastic and is secured to the frame members 10, 12 and 14 by suitable fasteners 34. Beneath the ring 30 is a skid plate 36 that is detachably secured to the lower frame member 14 so that the rear edge of the skid plate 36 rests upon the ground. Skid plate 36 thus serves to help maintain the folded plastic tube 42 in place on the ring 30, and to prevent the plastic from being snagged or torn when the apparatus is moved along the ground as described hereinafter.

Ring 30 is preferably provided with a rounded edge strip 38 so as to aid in the unfolding of the plastic tube 42. Also, a resilient member 40 is preferably provided around the ring 30 to aid in holding the plastic tube 42 in place and to assist the plastic tube 42 in properly unfolding.

In FIG. 4 there is illustrated a cross-sectional view of the plastic tube 42 in place on the ring 30. The plastic tube 42 is folded preferably to form an annular ring component which is folded radially accordion style, as shown in FIG. 4, then slipped over the ring 30. The trailing free end of the plastic tube 42 is then manually pulled rearwardly from the ring 30 and the resilient member 40 positioned over the plastic tube 42 around ring 30 and to the rear of the folds of the plastic tube 42 (See FIG. 4). If not already closed, the free trailing end of the plastic tube is then closed in any suitable manner such as by manually tying a knot in it. The apparatus is then ready for use. A tractor 44 having a spike-type bale carrier 46 is used to pick up a large round bale 48. As shown in FIG. 2, bale carrier 46 supports bale 48 in cantilevered fashion such that said bale has a supported end and a free end. As also illustrated in FIG. 2, the bale 48 is then moved, free end first, the ring 30. When the bale 48 is positioned inside of ring 30 and tube 42, the bale 48 is set down and the tractor 44 is then driven forwardly such that bale carrier 46 releases bale 48 inside of the ring. Simultaneously, a depending member 50 from the bale carrier 46 may then be lowered in place inside of the tongue 24, and as the tractor 44 is driven forwardly the entire apparatus will be pulled forwardly thereby (See FIG. 3). As the apparatus of the invention is pulled forwardly, the next section of the plastic tube 42 will unfold leaving the bale covered near the closed end of the plastic tube 42 and leaving the next section of plastic tube 42 unfolded and ready to receive the next bale. The depending member 50 of the bale carrier 46 is then disengaged from the tongue 24 and the process repeated until the tube is completely filled with bales.

In the foregoing description of my apparatus and the method of using it, it can be seen that the apparatus is a simple, inexpensive apparatus which when properly used in accordance with the principles of the invention provides a quick and easy method by which one person can bag large round bales. The apparatus uses folded plastic tubing, and by using the apparatus of the invention in accordance with the principles described herein, a single person can save a considerable amount of time while using a device that is relatively inexpensive to purchase. Obviously, the apparatus of the invention as described in the preferred embodiment can be constructed in a number of different ways. For example, the preferred embodiment has been described in a manner which permits it to be shipped in a disassembled condition and quickly and easily assembled for use. Also, the invention has been described for use in connection with round hay bales, but it can be used equally as well for bagging rectangular bales. Therefore, it will be evident to those skilled in the art that various revisions and modifications can be made to the preferred embodiment without departing from the spirit and scope of the invention. It is my intention, however, that all such revisions and modifications as are obvious to those skilled in the art will be included within the scope of the following claims.

What is claimed is:

1. In combination with a movable vehicle including means for lifting and carrying a large preformed bale extended from the vehicle, said vehicle having a towing attachment adjacent said lifting and carrying means; an improved apparatus for use in covering large performed bales by placing them inside of a tube of flexible weather-resistant material, said apparatus comprising a supporting frame, ground engaging means on the lower end of said frame to provide for towing of said frame along the ground, said ground engaging means having a forward end and a rearward end, a ring-like member supported by the frame with the axis of said member approximately horizontal for insertion of such bales therethrough, said member being engageable with the open end of such a tube of material for supporting said tube therearound, said frame and ring-like member disposed and designed to permit a bale to be extended through said member while so carried by such a vehicle for at least the distal end of the bale to be deposited through said member into the tube and resting on the subtending tube material on the ground and thereby anchoring said tube material, and towing means combined with said ground engaging means and disposed adjacent one side of said ring-like member for convenient engagement with said towing attachment to provide for towing of the apparatus by said vehicle following placement of each said bale in said tube by said vehicle so that additional tube material will be removed from said ring-like member as said ring-like member is towed and will be pulled over the bale to cover the bale completely and an additional length of said material will be extended therefrom to receive another bale and for disengagement from said towing attachment for said vehicle to lift and deposit another bale therein.

2. The apparatus of claim 1 in which a resilient means encircles the ring-like member to hold the flexible material in place on the ring-like member.

3. The apparatus of claim 1 in which the ground engaging means is a pair of spaced apart skids.

4. The apparatus of claim 1 in which the towing means is a member extending outwardly of said forward end of said ground engaging means so as to be easily engaged by an attachment on a towing vehicle, thereby providing for selective towing of the apparatus along the ground.

5. The apparatus of claim 1 in which the ring-like member is circular so as to be capable of receiving a circular tube of material.

6. An apparatus for use in placing large preformed bales in a protective, flexible, weather-resistant tube by a vehicle with means for lifting and carrying such bales extended from the vehicle, such vehicle including a towing device adjacent said lifting and carrying means, said apparatus comprising:

a generally annular member for supporting a radially accordion-folded flexible tube in a generally annular configuration, a frame for supporting said generally annular member such that the central axis of said generally annular member is substantially horizontal with respect to the ground, said frame and said annular member constructed and disposed to permit a bale to be extended through said member while so carried by such a vehicle for at least the distal end of the bale to be deposited in the tube and resting on the subtending tube material on the ground and thereby anchoring said bale and said tube material, ground engaging means having a forward end and a rearward end mounted on said frame to allow towing of said frame along the ground, and towing means for prompt engagement with and disengagement from said towing device of said vehicle, said towing means being mounted on said ground engaging means to facilitate towing of said apparatus, whereby said apparatus may be towed by said vehicle to unfold a portion of said tube upon placement of each said bale through said generally annular member into said tube, so that a plurality of large bales may be sequentially deposited through said generally annular member into said tube.

7. The apparatus of claim 6 further including a reilient means surrounding said generally annular member to hold said radially accordian-folded tube thereto.

8. The apparatus of claim 6 wherein said ground engaging means comprises a plurality of skids.

9. The apparatus of claim 6 wherein said towing means comprises a member extending outwardly of said front end of said ground engaging means and is readily engageable by a towing vehicle.

10. In combination with a movable vehicle including means for lifting and carrying a large preformed bale extended from the vehicle, said vehicle having a towing attachment adjacent said lifting and carrying means; an improved apparatus for use in covering large preformed bales by placing them inside of a tube of flexible weather-resistant material, said apparatus comprising a supporting frame, ground engaging means on the lower end of said frame to provide for towing of said frame along the ground, said ground engaging means having a forward end and a rearward end, a ring-like member supported by the frame with the axis of said member approximately horizontal for insertion of such bales therethrough, said member being engageable with the open end of such a tube of material for supporting said tube therearound, said frame and ring-like member disposed and designed to permit a bale to be extended through said member while so carried by such a vehicle for at least the distal end of the bale to be deposited through said member into the tube and resting on the subtending tube material on the ground and thereby anchoring said tube material, and towing means disposed adjacent one side of said ring-like member for convenient engagement with said towing attachment to provide for towing of the apparatus by said vehicle following placement of each said bale in said tube by said vehicle so that additional tube material will be removed from said ring-like member as said ring-like member is towed and an additional length of said material will be extended therefrom to receive another bale and for disengagement from said towing attachment for said vehicle to lift and deposit another bale therein.

11. The apparatus of claim 10 wherein said towing means is positioned below said ring-like member and extends forwardly thereof so as to be easily engaged by an attachment on a towing vehicle, thereby providing for selective towing of the apparatus along the ground.

12. The apparatus of claim 11, wherein said towing attachment of said vehicle comprises a depending member on the underside of said lifting and carrying means and said towing means comprises an essentially horizontally disposed member defining a hitch means for engagement with said depending member.

* * * * *